US007603462B2

United States Patent
Tang et al.

(10) Patent No.: US 7,603,462 B2
(45) Date of Patent: *Oct. 13, 2009

(54) METHODS AND COMPUTER PROGRAM PRODUCTS THAT MANAGE COMMUNICATION INTERFACES BETWEEN ORDER HANDLING PROGRAMS

(75) Inventors: Harry Tang, Atlanta, GA (US); James Kelley, Acworth, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/031,067

(22) Filed: Feb. 14, 2008

(65) Prior Publication Data
US 2008/0140833 A1    Jun. 12, 2008

Related U.S. Application Data

(63) Continuation of application No. 10/680,802, filed on Oct. 7, 2003, now Pat. No. 7,334,034.

(51) Int. Cl.
*G06F 13/00* (2006.01)

(52) U.S. Cl. .................. 709/224; 709/219; 709/250; 705/26; 705/28

(58) Field of Classification Search ............ 709/217, 709/219, 223, 224, 225, 250; 705/26, 28
See application file for complete search history.

(56) References Cited

U.S. PATENT DOCUMENTS

| 6,970,838 | B1* | 11/2005 | Kamath et al. ............. 705/26 |
| 7,039,604 | B1 | 5/2006 | Srinivasan et al. |
| 7,116,707 | B1 | 10/2006 | Armistead |
| 7,409,431 | B2* | 8/2008 | Yamaguchi et al. ........ 709/207 |
| 2001/0056395 | A1 | 12/2001 | Khan |
| 2002/0087414 | A1 | 7/2002 | Takatsu |

* cited by examiner

*Primary Examiner*—Viet Vu
(74) *Attorney, Agent, or Firm*—Myers Bigel Sibley & Sajovec, P.A.

(57) ABSTRACT

A communication interface between an order generating program that generates orders and an order processing program that processes orders is managed. At least one metric that is based on orders passing from the order generating program to the order processing program is monitored. The communication interface between the order generating program and the order processing program is determined to have failed based on the monitored metric. The communication interface is then restarted based on when it has been determined to have failed.

20 Claims, 3 Drawing Sheets

METHODS AND COMPUTER PROGRAM PRODUCTS THAT MANAGE COMMUNICATION INTERFACES BETWEEN ORDER HANDLING PROGRAMS

CROSS REFERENCE TO RELATED APPLICATION

This application is a continuation of U.S. application Ser. No. 10/680,802, filed Oct. 7, 2003 now U.S. Pat. No. 7,334,034, the disclosure of which is hereby incorporated herein by reference in its entirety as if set forth fully herein.

FIELD OF THE INVENTION

This invention relates generally to data processing systems and, more particularly, to order processing systems.

BACKGROUND OF THE INVENTION

A computer system may use multiple component systems to generate and process orders, such as service orders. The component systems may reside on different networked computers. For example, one component system may generate orders and place the orders in a queue. Another component system may then retrieve the orders through a communication interface to the queue, and process the orders. Accordingly, for orders to be generated and processed properly by the computer system, the communication interface between the component systems must operate properly.

SUMMARY OF THE INVENTION

Some embodiments of the present invention provide methods and computer program products that manage a communication interface between an order generating program that generates orders and an order processing program that processes orders. At least one metric that is based on orders passing from the order generating program to the order processing program is monitored. The communication interface between the order generating program and the order processing program is determined to have failed based on the monitored metric. The communication interface is then restarted based on when it has been determined to have failed.

In some other embodiments of the present invention, the monitored metric may be based on time of arrival of orders from the order generating program. The monitored metric may include a trend over time of the elapsed time between orders passing from the order generating program to the order processing program. The communication interface may be determined to have failed when a threshold time has elapsed since an order has passed from the order generating program to the order processing program. The threshold time may be based on time of day and/or day, such, for example, the day of a week. When the communication interface is determined to have failed, it may be restarted by recycling the interface program objects, such as, for example, by invoking a program object that removes a proxy for the communication interface, and invoking a program object that creates a proxy for a new communication interface between the order generating program and the order processing program.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
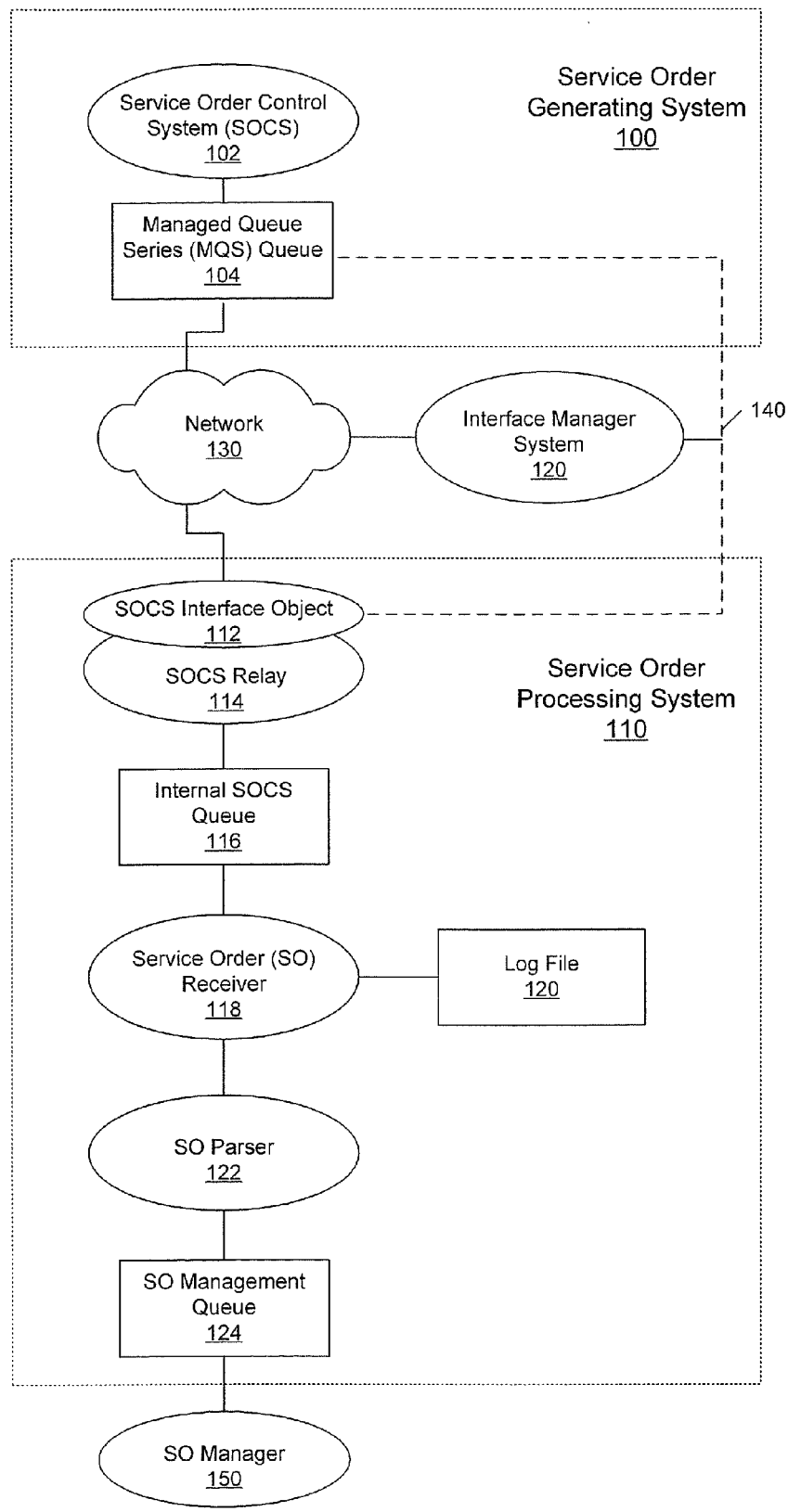
FIG. 1 is a block diagram of a computer system that is configured to process orders according to embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numerals refer to like elements throughout.

As will be appreciated by one of skill in the art, the present invention may be embodied as methods and/or computer program products. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on a user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 illustrates a computer system according to various embodiments of the present invention that includes a service order generating system 100, a service order processing system 110, and an interface manager system 120, which are interconnected by one or more networks 130 and/or by direct connections 140. The network 130 may be, for example, a wired and/or wireless local area network and/or wide area network.

The service order generating system 100 generates orders, such as, for example, service orders that relate to establishing, changing, and/or repairing communication services (e.g., telephone services and/or data communication services) that are provided by a service provider for new and existing customers. The service order processing system 110 may, for example, verify the orders and process the orders into a format that may be used by a service order manager 150. The service order manager 150 may manage the assignment of service orders to persons and monitor work-in-progress and completion status of the service orders.

The service order generating system 100 may include a service order control system (SOCS) 102 and a queue, such as, a Managed Queue Series (MQS) queue 104. The SOCS 102 generates service orders based on information that is, for example, input to SOCS 102 through a user interface (e.g., typed by an operator receiving a customer service call), and/or based on information that is received from customers over a network, such as the Internet. The service orders are placed in the MQS queue 104, which may be based on an IBM MQSeries product.

The service order processing system 110 may include a SOCS interface object 112, a SOCS relay 114, an internal SOCS queue 116, a service order receiver 118, a log file 120, a service order parser 122, and a service order management queue 124. The SOCS interface object 112 forms a communication interface, through a proxy to the MQS queue 106, and through which the SOCS relay 114 can read service orders from the MQS queue 104 via the network 130 and/or the direct connection 140. The SOCS relay 114 places the service orders into the internal SOCS queue 116. The service order receiver 118 reads service orders from the internal SOCS queue 116, validates the service orders, and records information regarding the service orders in the log file 120.

Service orders may be validated to confirm that they contain information that satisfies predefined criteria, such as, for example, completeness of information that is necessary for processing of a service order, appropriate service dates, and/or phone numbers and/or addresses that match known customers' information. The service order parser 122 extracts information from predefined fields of the service orders and generates parsed service orders that may be used by, for example, field technicians, accounting systems, and/or other systems to process and/or track service orders. The parsed service orders are placed in the service order management queue 124, where they may be read by the service order manager 150.

The communication interface between the service order generating system 100 and the service order processing system 110 may fail, such that generated service orders cannot be processed, or may not be reliably processed, by the service order processing system 110. For example, the proxy that is formed by the SOCS interface object 112 and used for the communication interface to the MQS queue 104 may fail because of a communication problem in the network 130, because of errors that occur when reading service orders from the MQS queue 104, and/or because of conditions that may be related to downstream processing of service orders by the other components in the service order processing system 110 and/or the service order manager 150.

The interface manager system 120 manages the communication interface between the service order generating system 100 and the service order processing system 110. The interface manager system 120 monitors one or more metrics related to service orders passing from the service order generating system 100 to the service order processing system 110. The interface manager system 120 determines that the communication interface has failed based on the monitored metric(s), and restarts the communication interface based on determining that the communication interface failed.

Figure 2:
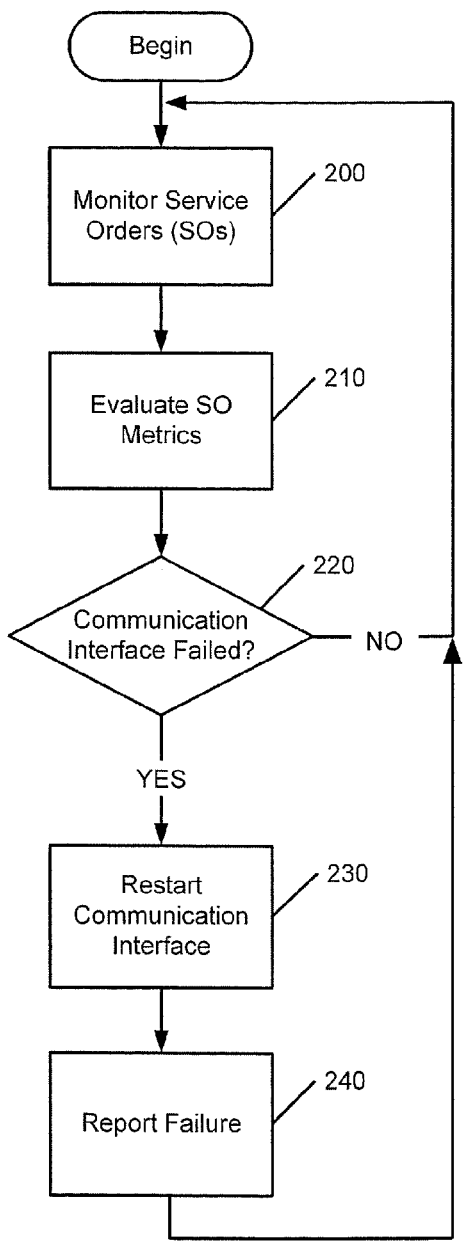
FIG. 2 is a flowchart that illustrates operations for managing an interface between service order handling objects according to embodiments of the present invention.

FIG. 2 shows operations that may be used by, for example, the interface manager system 120 to manage the communication interface between the service order generating system 100 and the service order processing system 110. At Block 200, at least one metric that is based on service orders passing from the service order generating system 100 and the service order processing system 110 is monitored. For example, the time of arrival of service orders and/or elapsed time since a service order has passed from the service order generating system 100 to the service order processing system 110 may be monitored.

At Block 210, the monitored metric is evaluated to determine whether the communication interface has failed. The communication interface may be determined to have failed when, for example, a threshold time has elapsed since a service order has passed from the service order generating system 100 to the service order processing system 110. The threshold time may vary based on time of day and/or day, such as, for example, the day of a week, month, and/or year. For example, the threshold time may be determined from a known relationship between the maximum elapsed time that is expected between service orders being received by the service order processing system 110 and the time of day and/or day of the week. In a further example, the threshold time between service orders may be shortest during days and times when the highest rate of generated customer service orders is expected. In some embodiments of the present invention, the communication interface may be determined to have failed when one or more metrics that are associated with the service orders indicate that the communication interface may be unable to reliably transfer service orders between the service order generating system 100 and the service order processing system 110. Such metrics may include, for example, the rate of transfer of service orders and/or the error rate of information that is contained in the service orders.

Figure 3:
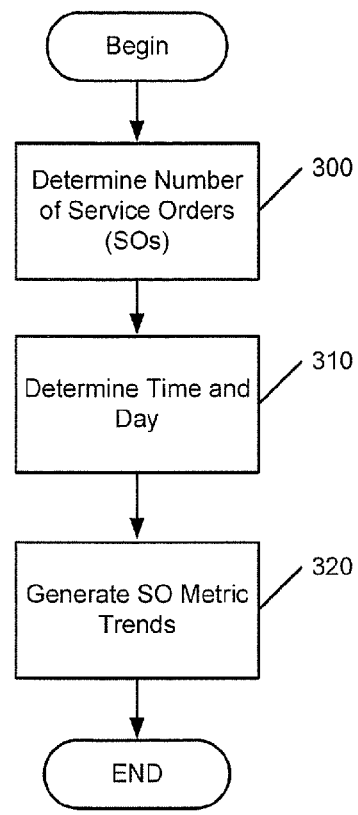
FIG. 3 is a flowchart that illustrates operations for generating metrics for use in evaluating interfaces between service order handling objects according to embodiments of the present invention.

FIG. 3 shows operations that may be performed to develop a trend over time relating to service orders, and which may be used to evaluate whether the communication interface has failed. At Block 300, the number of service orders that have passed to the service order processing system 110 is monitored, and, at Block 310, the elapsed time between service orders and/or the corresponding time and day of the arrival of service orders are monitored. At Block 320, one or more trends are generated based on the time between service orders, the number of service orders over time, and/or other relationships relating to the service orders. The generated trend(s) may be used at Block 210 of FIG. 2 to determine whether the communication interface has failed.

With continuing reference to FIG. 2, when the communication interface is determined at Block 220 to have failed, then at Block 230 the communication interface is restarted. For example, a Java daemon process may be used to monitor, at Block 200, service orders that flow through a Weblogic J2EE server. When the communication interface is determined to have failed (e.g., elapsed time between service orders exceeds threshold time), the Java daemon process may invoke a Unix shell script, which then invokes another client process as a Weblogic J2EE server process. The client process may request the J2EE server process to reestablish the communication connection.

In yet another example, the communication interface may be restarted by invoking a program object that removes a proxy for the communication interface between the service order generating system 100 and the service order processing system 110, by, for example, removing the SOCS interface object 112. A program object may then be invoked that creates a new proxy for a new communication interface between the service order generating system 100 and the service order processing system 110, by, for example, generating a new or restarted SOCS interface object 112. The SOCS relay 114 may then read service orders from the MQS Queue 106 via the proxy for the new communication interface (e.g., the new or restarted SOCS interface object 112).

At Block 240, a report may be generated that indicates that the communication interface failed and/or that the communication interface was restarted. The operations may then loop back to Block 200 to continue to monitor the service orders and, thereby, the communication interface.

Although FIGS. 1-3 illustrate an exemplary computer system and exemplary flow charts of operations, it will be understood that the present invention is not limited to such configurations, but is intended instead to encompass any configuration capable of carrying out the operations described herein. For example, although the interface manager system 120 is shown as separate from the service order generating system 100 and the service order processing system 110, it is to be understood that in some embodiments of the present invention the interface manager system 120 may be part of the service order generating system 100 and/or the service order processing system 110. The interface manager system 120, the service order generating system 100, and service order processing system 110 may reside on one or more data processing systems, such as, for example, one or more data servers.

For purposes of illustration only, various embodiments of the present invention have been described in the context of service orders. However, it is to be understood that some embodiments of the present invention may be used to manage a communication interface between a purchase order generating system and a purchase order processing system. Moreover, in some embodiments of the present invention, a communication interface between two or more program objects is managed. At least one metric that is based on communication between at least two program objects is monitored. The communication interface is determined to have failed based on the monitored metric, and is restarted when it has been determined to have failed. The monitored metric may relate to flow of information between the program objects, including, but not limited to, timing, latency, error rate, quality of service, and/or traffic shape.

Figure 4:
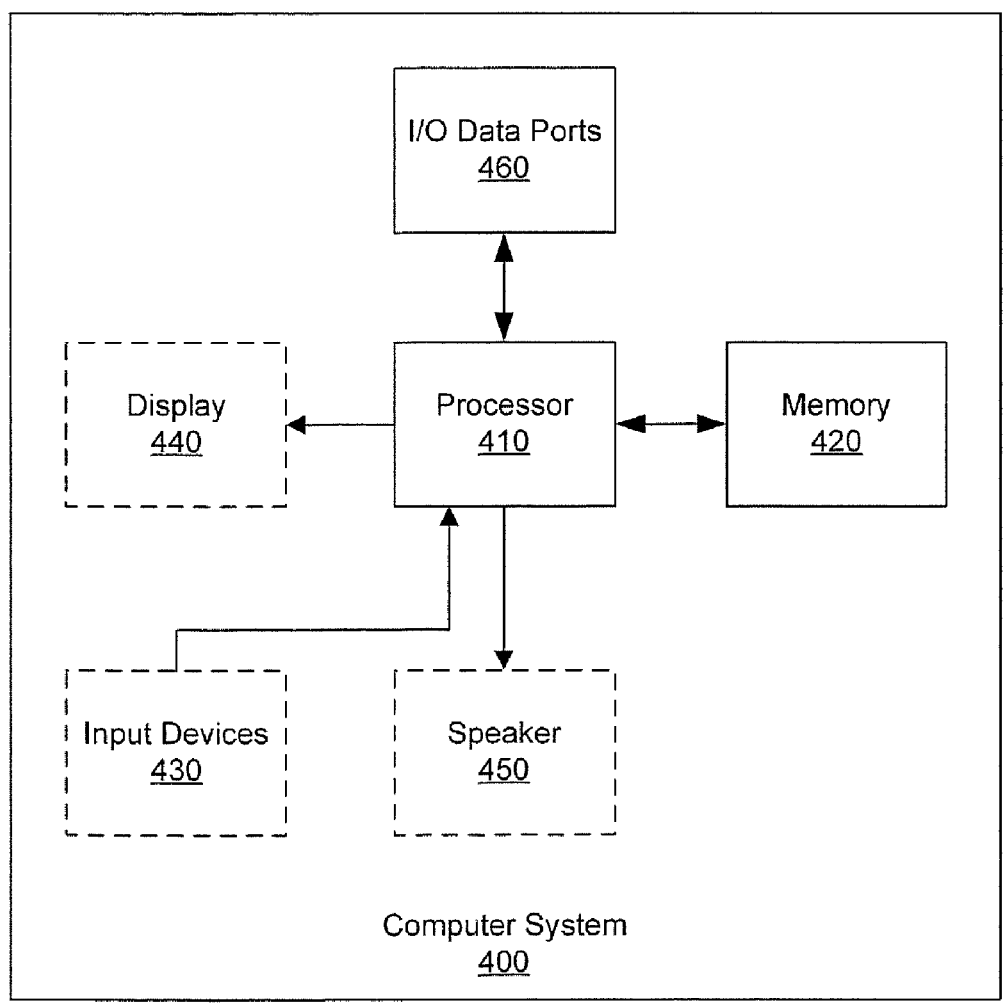
FIG. 4 is a block diagram of a computer according to embodiments of the present invention.

FIG. 4 illustrates an exemplary embodiment of a data processing system 400 that is suitable for use as the service order generation system 100, the service order processing system 110, and/or the interface manager system 120 in accordance with various embodiments of the present invention. The data processing system 400 typically includes a processor 410 that communicates with a memory 420. The data processing system 400 may, optionally, include input device(s) 430 such as a keyboard or keypad, and a display 440 (illustrated in dashed lines) that also communicate with the processor 410. The data processing system 400 may further include optional devices such as a speaker 450, and an I/O data port(s) 460 that also communicate with the processor 410. The I/O data ports 460 can be used to transfer information between the data processing system 400 and another computer system, a network, and/or a peripheral device such as a printer. These components may be conventional components such as those used in many conventional data processing systems which may be configured to operate as described herein.

The processor 410 can be any commercially available or custom microprocessor. The memory 420 is representative of the overall hierarchy of memory devices containing the software and data used to implement the functionality of the data processing system 400. The memory 420 can include, but is not limited to, the following types of devices: cache, ROM, PROM, EPROM, EEPROM, flash memory, SRAM, and DRAM. The memory 420 may include several categories of software and data used in the data processing system 400: an operating system; application programs; input/output (I/O) device drivers; and data. As will be appreciated by those of skill in the art, the operating system may be any operating system suitable for use with a data processing system, such as OS/2, AIX or System390 from International Business Machines Corporation, Armonk, N.Y., Windows95, Windows98, Windows2000, Windows NT, Windows ME, Windows XP from Microsoft Corporation, Redmond, Wash., Unix or Linux. The I/O device drivers typically include software routines accessed through the operating system by the application programs to communicate with devices such as the I/O data port(s) 460 and certain memory 420 components. The application programs are illustrative of the programs that implement the various features of the data processing system 400 and preferably include at least one application which supports operations according to embodiments of the present invention.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A computer system comprising:
  an interface manager system that manages a communication interface between an order generating program that generates orders and an order processing program that processes orders, wherein the interface manager system is configured to generate a trend over time for elapsed time between orders passing from the order generating program to the order processing program, configured to determine that the communication interface between the order generating program and the order processing program has failed by evaluating elapsed time since an order has passed from the order generating program to the order processing program based on the trend over time, and configured to initiate at least one action based on determining that the communication interface has failed.

2. The computer system of claim 1, wherein the at least one action initiated by the interface manager system based on determining that the communication interface has failed comprises restarting the communication interface between the order generating program and the order processing program.

3. The computer system of claim 1, wherein the at least one action initiated by the interface manager system based on determining that the communication interface has failed comprises generating a report that indicates that the communication interface failed between the order generating program and the order processing program.

4. The computer system of claim 1, wherein the interface manager system monitors communication traffic between the order generating program and the order processing program across a communication network to generate the trend over time for elapsed time between orders passing from the order generating program to the order processing program and continues to monitor the communication traffic to determine when the communication interface between the order generating program and the order processing program has failed.

5. The computer system of claim 1, wherein the interface manager system monitors time of arrival orders from the order generating program to generate the trend over time for elapsed time between orders passing from the order generating program to the order processing program.

6. The computer system of claim 1, wherein the interface manager system determines that the communication interface between the order generating program and the order processing program has failed when a threshold time has elapsed since an order has passed from the order generating program to the order processing program.

7. The computer system of claim 6, wherein the interface manager system varies the threshold time based on the present time of day compared to the generated trend over time for elapsed time between orders passing from the order generating program to the order processing program.

8. The computer system of claim 6, wherein the interface manager system varies the threshold time based on the present day of the week compared to the generated trend over time for elapsed time between orders passing from the order generating program to the order processing program.

9. The computer system of claim 1, wherein the interface manager system generates an association between the time of day and elapsed time between orders passing from the order generating program to the order processing program, and determines that the communication interface between the order generating program and the order processing program has failed by evaluating elapsed time since an order has passed from the order generating program to the order processing program for a present time of day.

10. The computer system of claim 9, wherein the interface manager system generates an association between time of day and a maximum elapsed time between orders passing from the order generating program to the order processing program, and determines that the communication interface has failed when the elapsed time since an order has passed from the order generating program to the order processing program exceeds the maximum elapsed time.

11. The computer system of claim 1, wherein the interface manager system further generates the trend over time to indicate error rates for information that is contained in orders from the order generating program.

12. The computer system of claim 11, wherein the interface manager system is further configured to determine that the communication interface between the order generating program and the order processing program has failed based on a comparison of a present error rate for information in orders compared to the trend over time for error rates for information in orders.

13. The computer system of claim 1, wherein, in response to determining that the communication interface has failed, the interface manager system restarts the communication interface by invoking a program object that removes a proxy for the communication interface between the order generating program and the order processing program, and by invoking a program object that removes a proxy for the communication interface between the order generating program and the order processing program, and by invoking a program object that creates a proxy for a new communication interface between the order generating program and the order processing program.

14. The computer system of claim 13, wherein the interface manager system restarts the communication interface by triggering the service order processing system to remove a proxy for the failed communication interface and to invoke a program object that creates a proxy for a new communication interface between the order generating program and the order processing program.

15. A method of managing a communication interface between an order generating program that generates orders and an order processing program that processes orders, the method comprising:
  computer-implemented generating a trend over time for elapsed time between orders passing from the order generating program to the order processing program;
  computer-implemented determining that the communication interface between the order generating program and the order processing program has failed by evaluating elapsed time since an order has passed from the order generating program to the order processing program based on the trend over time; and
  computer-implemented initiating at least one action based on determining that the communication interface has failed.

16. The method of claim 15, wherein the computer-implemented initiating at least one action comprises restarting the communication interface between the order generating program and the order processing program based on determining that the communication interface has failed.

17. The method of claim 15, wherein the computer-implemented initiating at least one action comprises generating a report that indicates that the communication interface failed between the order generating program and the order processing program.

18. The method of claim 15, wherein the computer-implemented generation of the trend over time further comprises monitoring error rates for information that is contained in orders from the order generating program.

19. The method of claim 18, further comprising computer-implemented determining that the communication interface between the order generating program and the order processing program has failed based on a comparison of a present error rate for information in orders from the order generating program compared to the trend over time for error rates for information in orders.

20. A computer program product for managing a communication interface between an order generating program that generates orders and an order processing program that processes orders, the computer program product comprising program code embodied in a computer-readable storage medium, the computer program code comprising:

program code that when executed by a computer is configured to generate a trend over time for elapsed time between orders passing from the order generating program to the order processing program;

program code that when executed by a computer is configured to determine that the communication interface between the order generating program and the order processing program has failed by evaluating elapsed time since an order has passed from the order generating program to the order processing program based on the trend over time; and program code that when executed by a computer is configured to initiate at least one action based on determining that the communication interface has failed.

\* \* \* \* \*

UNITED STATES PATENT AND TRADEMARK OFFICE
CERTIFICATE OF CORRECTION

| | | |
|---|---|---|
| PATENT NO. | : 7,603,462 B2 | Page 1 of 1 |
| APPLICATION NO. | : 12/031067 | |
| DATED | : October 13, 2009 | |
| INVENTOR(S) | : Tang et al. | |

It is certified that error appears in the above-identified patent and that said Letters Patent is hereby corrected as shown below:

In the Claims

Column 8, Claim 13, Lines 21-24: Please correct claim by deleting duplicate wording "removes a proxy for the communication interface between the order generating program and the order processing program, and by invoking a program object that".

Column 9, Claim 20, Line 5: Please correct claim by adding a space: "interfacebetween" to read -- interface between --.

Signed and Sealed this

Twelfth Day of January, 2010

David J. Kappos
*Director of the United States Patent and Trademark Office*